(12) United States Patent
Hainsworth et al.

(10) Patent No.: US 9,272,785 B2
(45) Date of Patent: Mar. 1, 2016

(54) WING MOUNT ADJUSTMENT (71) Applicant: Sikorsky Aircraft Corporation, Stratford, CT (US)

(72) Inventors: Barton J. Hainsworth, Oxford, CT (US); Donald M. Bossardet, Gales Ferry, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 85 days.

(21) Appl. No.: 13/947,869

(22) Filed: Jul. 22, 2013

(65) Prior Publication Data

US 2015/0021436 A1  Jan. 22, 2015

(51) Int. Cl.
*B64D 7/08* (2006.01)
*B64D 1/02* (2006.01)
*B64D 7/04* (2006.01)

(52) U.S. Cl.
CPC .. *B64D 7/08* (2013.01); *B64D 1/02* (2013.01); *B64D 7/04* (2013.01); *Y10T 29/49826* (2015.01)

(58) Field of Classification Search
CPC ......... F41A 23/60; F41A 23/56; F41A 23/58; F41A 23/20; F41A 23/00; B64D 1/02–1/08; B64D 1/12; B64D 7/00; B64D 9/00; B64D 7/08; B64D 7/04; B64C 7/00
USPC .............. 244/118.1, 54, 137.4; 89/1.54, 1.51, 89/1.59, 1.53, 1.58; 294/82.26
See application file for complete search history.

(56) References Cited

U.S. PATENT DOCUMENTS

| 653,028 | A | * | 7/1900 | Mansfield et al. ................. 89/39 |
| 3,624,833 | A | * | 11/1971 | Ricard ........................ 244/118.1 |
| 4,008,645 | A | * | 2/1977 | Herbert .......................... 89/1.51 |
| 4,256,276 | A | * | 3/1981 | Ciminera et al. .......... 244/118.1 |
| 4,412,475 | A | | 11/1983 | Hornby |
| 4,974,499 | A | * | 12/1990 | Sanderson et al. ................ 89/1.4 |
| 5,065,961 | A | * | 11/1991 | Ellis et al. ................... 244/137.4 |
| 5,118,185 | A | | 6/1992 | Courten |
| 5,379,676 | A | | 1/1995 | Profeta et al. |
| 5,497,575 | A | * | 3/1996 | Fried .................................. 42/94 |
| 6,401,592 | B1 | | 6/2002 | Rostocil |
| 6,889,592 | B2 | * | 5/2005 | Isker et al. ...................... 89/1.53 |
| 7,550,697 | B2 | | 6/2009 | Veselovsky et al. |
| 7,624,947 | B2 | * | 12/2009 | Dortch et al. .............. 244/137.4 |
| 2012/0193481 | A1 | | 8/2012 | Doyle, Jr. et al. |

* cited by examiner

*Primary Examiner* — Tien Dinh
*Assistant Examiner* — Alexander V Giczy
(74) *Attorney, Agent, or Firm* — Cantor Colburn LLP (57) ABSTRACT

A mounting apparatus includes a fixed mounting structure that includes a first fixed fitting including a plurality of first flanges and a second fixed fitting. A rotatable mounting structure has a swivel fitting configured to engage and swivel with respect to the first fixed fitting. The swivel fitting includes a plurality of second flanges, one of which is configured to rest on one of the plurality of first flanges when the swivel fitting and first fixed fitting are engaged. The rotatable mounting structure also has a slide fitting configured to slide with respect to the second fixed fitting based on the swivel fitting being engaged with the first fixed fitting. An adjustment assembly is arranged at an interface between the second fixed fitting and the slide fitting. The adjustment assembly is configured to adjust an angular position of the slide fitting relative to the swivel fitting.

16 Claims, 6 Drawing Sheets

WING MOUNT ADJUSTMENT

BACKGROUND OF THE INVENTION

The subject matter disclosed herein relates to a mount for a vehicle wing, and in particular to an adjustable mount and method of adjusting the mount.

Conventional aircraft bore sight mounts include screws that extend from an object to be mounted and are affixed to the bore sight mount with a nut. Adjusting the nut adjusts the position of the mounted object. Typically, each end of the object includes multiple screws to permit three-dimensional adjustment of the object.

BRIEF DESCRIPTION OF THE INVENTION

According to one aspect of the invention, a mounting apparatus includes a fixed mounting structure that is fixed relative to a vehicle wing, the fixed mounting structure including a first fixed fitting and a second fixed fitting. The apparatus includes a rotatable mounting structure having a swivel fitting configured to engage the first fixed fitting and to swivel with respect to the first fixed fitting. The rotatable mounting structure also has a slide fitting configured to slide with respect to the second fixed fitting based on the swivel fitting being engaged with the first fixed fitting.

According to another aspect of the invention, a method of mounting an object to a vehicle wing includes engaging a swivel fitting with a first fixed fitting. The first fixed fitting is fixed with respect to the vehicle wing and the swivel fitting is rotatable with respect to the vehicle wing. The method also includes engaging a slide fitting with respect to the second fixed fitting while the swivel fitting is engaged with the first fixed fitting. The slide fitting is configured to slide with respect to the second fixed fitting while being supported by the second fixed fitting.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Conventional mounts for mounting objects to a vehicle wing require the adjustment of multiple screws on an object to properly align the object, and when an object is removed, the alignment process must be repeated for any new object. Embodiments of the invention relate to a mounting apparatus having a swivel mount and a slide mount for mounting an object to a vehicle wing.

Figure 1:
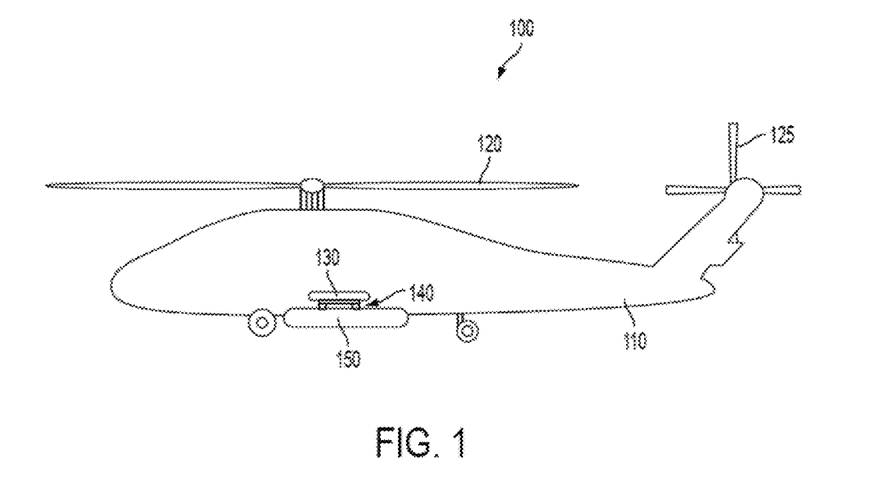
FIG. 1 illustrates an aircraft according to an embodiment of the invention.

FIG. 1 illustrates an aircraft 100 according to an embodiment of the invention. The aircraft 100 includes a fuselage 110, rotors 120 and 125 for lift and positioning, a wing 130, a mounting apparatus 140, and an object 150 mounted to the wing 130. While FIG. 1 illustrates a helicopter, embodiments of the invention are directed to any vehicle having a wing extending from the fuselage or body of the vehicle. In one embodiment, the object is a weapon, such as a rocket launcher.

Figure 2:
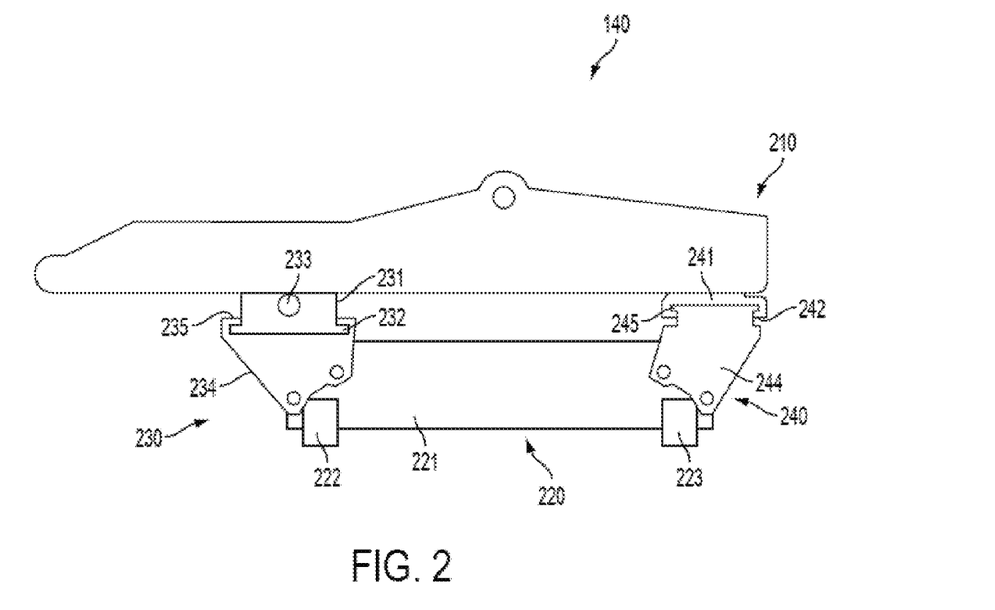
FIG. 2 illustrates a mount apparatus according to one embodiment of the invention.

FIG. 2 illustrates a mounting apparatus 140 according to an embodiment of the invention. The mounting apparatus 140 includes a fixed mounting structure 210 and a rotatable mounting structure 220, which is rotatable with respect to the fixed mounting structure 210 during a mounting process. The fixed mounting structure 210 is fixed with respect to a surface, such as the aircraft wing 130 of FIG. 1, to which the fixed mounting structure 210 is mounted.

The mounting apparatus 140 includes a swivel mount 240 and a slide mount 230. The swivel mount 240 includes a first fixed fitting 241 and a swivel fitting 244. The first fixed fitting 241 is fixed with respect to the fixed mounting structure 210, and may be considered part of the fixed mounting structure 210. The swivel fitting 244 is configured to swivel with respect to the first fixed fitting 241 during a mounting operation, and may be considered part of the rotatable mounting structure 220. In the embodiment illustrated in FIGS. 1 and 2, the swivel mount 240 is located aft of the slide mount 230, such that the slide mount adjusts the facing of an object connected to both the swivel mount 240 and the slide mount 230. However, embodiments of the invention encompass any configuration of the swivel mount 240 and slide mount 230 with respect to the front and rear of a vehicle or wing.

The first fixed fitting 241 includes a flange 242, and the swivel fitting 244 includes a flange 245. During a mounting process in which the rotatable mounting structure 220 is mounted to the fixed mounting structure 210, the flange 245 of the swivel fitting 244 is inserted into the claw-shaped first fixed fitting 241 and rotated, such that the flange 242 of the first fixed fitting 241 supports the flange 245 of the swivel fitting 244.

The slide mount 230 includes a second fixed fitting 231 and a slide fitting 234. The second fixed fitting 231 is fixed with respect to the fixed mounting structure 210, and may be considered part of the fixed mounting structure 210. The slide fitting 234 is configured to slide in an arc with respect to the second fixed fitting 231 during a mounting operation, and may be considered part of the rotatable mounting structure 220.

The second fixed fitting 231 includes a flange 232, and the slide fitting 234 includes a flange 235. During a mounting process in which the rotatable mounting structure 220 is mounted to the fixed mounting structure 210, the flange 235 of the slide fitting 234 is slid over the flange 232 of the second fixed fitting 231, such that the flange 232 of the second fixed fitting 231 supports the flange 235 of the slide fitting 234.

In further detail, during a mounting operation, as the swivel fitting 244 is inserted into the first fixed fitting 241, the flange 235 of the slide fitting 234 may be un-aligned with the flange 232 of the second fixed fitting 231. Then, as the swivel fitting 244 swivels within the first fixed fitting 241, the flange 245 of the swivel fitting 244 aligns with the flange 242 of the first fixed fitting 241 to support the flange 245 of the swivel fitting 244; and the flange 235 of the slide fitting 234 slides over the flange 232 of the second fixed fitting 231, such that the flange 232 of the second fixed fitting 231 supports the flange 235 of the slide fitting 234.

In one embodiment, the swivel fitting 244 swivels around a rotation axis passing through each of the swivel fitting 244 and the first fixed fitting 241, such as at a center of the swivel fitting 244 and the first fixed fitting 241. The slide fitting 234 slides in an arc having as its center the rotation axis of the swivel fitting 244, such that the slide fitting 234 revolves at a same angular velocity as the swivel fitting 244 rotates.

In embodiments of the invention, the slide mount 230 may further include an adjustment screw 233 which provides fine-tuning of the angular position of the slide fitting 234 relative to the rotation axis. In other words, the adjustment screw 233 adjusts the position of the slide mount in a lateral direction or a sliding direction. Additional embodiments include one or more vertical adjustment devices to adjust a change in height or pitch of the rotatable mounting structure 220.

The rotatable mounting structure 220 may include a main body 221 attachment interfaces 222 and 223 to connect to an object that is to be mounted to the vehicle wing. The attachment interfaces may include screws, latches, bolts or any other attachment mechanisms. In an alternative embodiment, the main body 221 may be part of an object to be mounted to the aircraft wing, such that the object connects directly to the slide fitting 234 and the swivel fitting 244.

Figure 3:
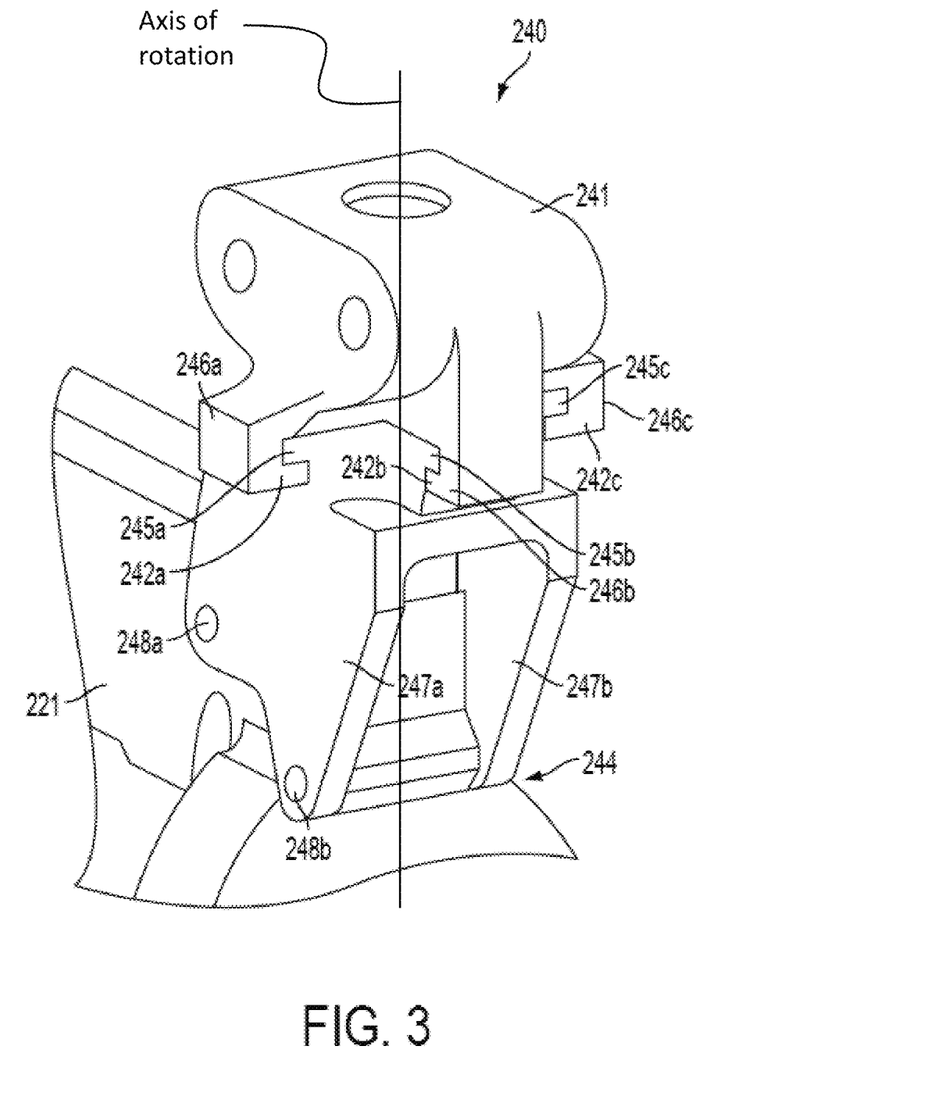
FIG. 3 illustrates a swivel mount according to an embodiment of the invention.

FIG. 3 illustrates the swivel mount 240 in greater detail according to an embodiment of the invention. The swivel mount 240 includes the first fixed fitting 241 and the swivel fitting 244. The first fixed fitting 241 includes multiple engagement portions including flanges 242a, 242b and 242c connected to the body of the first fixed fitting 241 by extended portions 246a, 246b and 246c. The extended portions 246a-246c extend from the body of the first fixed fitting 241 and the flanges 242a-242c extend from the extended portions at an angle perpendicular to the extended portions 246a-246c to form a claw shape. While three engagement portions including the flanges 242a-242c and extended portions 246a-246c are illustrated in FIG. 3, it is understood that the swivel mount 240 may include four engagement portions arranged in opposing pairs. Alternatively, any number of engagement portions including an extended portion and flange may be provided, from one up to any desired number.

In embodiments of the invention, the first fixed fitting 241 is configured to permit the swivel fitting 244 to be securely mounted to the first fixed fitting 241 and to swivel within the first fixed fitting 241 to align an object to a desired facing. In FIG. 3, spaces exist between the engagement portions including the flanges 242a-242c and extended portions 246a-246c. In addition, spaces exist between flanges 245a, 245b and 245c of the swivel fitting 244. During a mounting process, the flanges 245a-245c are inserted in the spaces between the flanges 242a-242c and the swivel fitting 244 is rotated until the flanges 245a-245c are located in the spaces defined by the flanges 242a-242c and extended portions 246a-246c, and the flanges 245a-245c are supported by the flanges 242a-242c of the first fixed fitting 241.

The swivel fitting 244 may include walls 247a and 247b between which the main body 221 may be positioned. Holes 248a and 248b are located in the walls 247a and 247b to receive bolts or other fixing mechanisms to fix the main body 221 of the rotatable mounting structure 220 with respect to the swivel fitting 244.

While FIG. 3 illustrates the first fixed fitting 241 as having the claw-like shape, with inwardly protruding flanges 242a-242c, and the swivel fitting 244 as having the "T" cross-section shape with outwardly-protruding flanges 245a-245c, it is understood that the configurations of the first fixed fitting 241 and the swivel fitting 244 may be reversed. For example, the swivel fitting 244 may have inwardly-protruding flanges and the first fixed fitting 241 may have outwardly-protruding flanges.

Figure 4A:
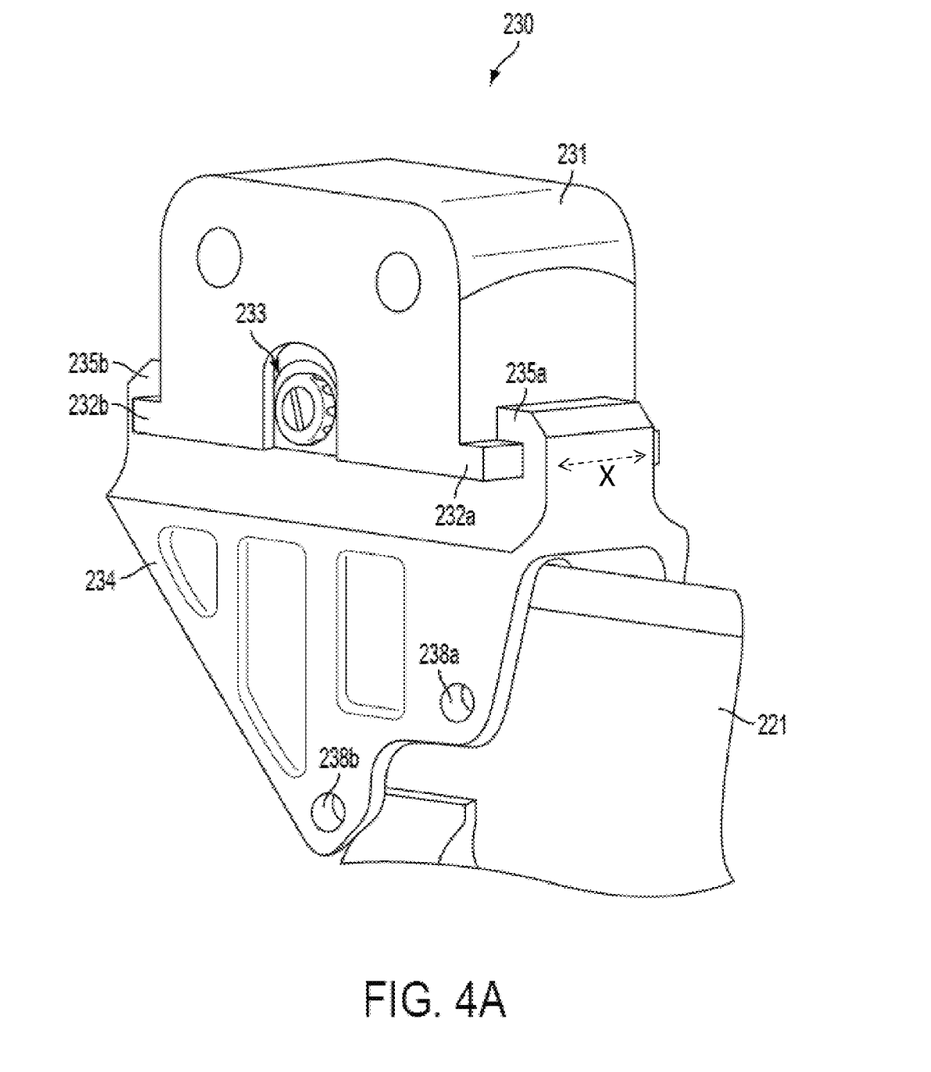
FIG. 4A illustrates a slide mount according to an embodiment of the invention.
Figure 4B:
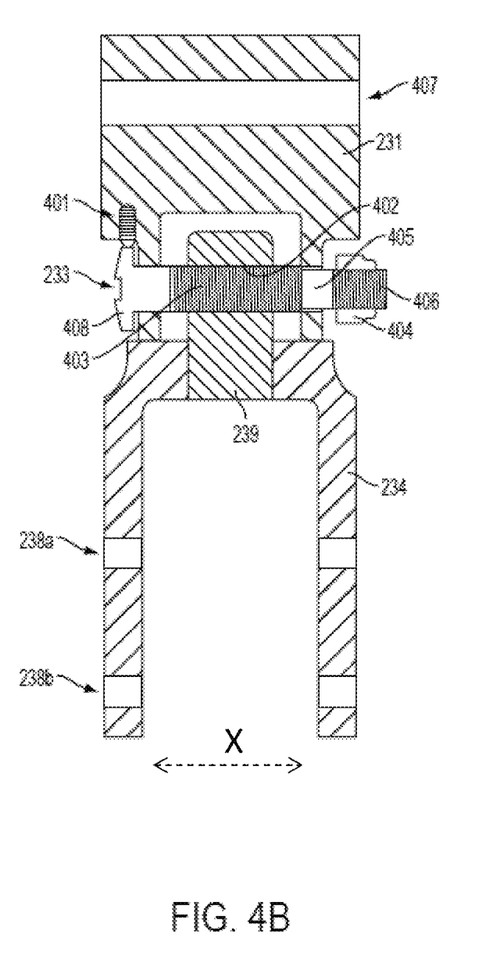
FIG. 4B is a cross-section view of the slide mount according to an embodiment of the invention.

FIGS. 4A and 4B illustrate the slide mount 230 according to an embodiment of the invention. FIG. 4A is a perspective view of the slide mount 230, and FIG. 4B is a cross-section view of the slide mount 230. The slide mount 230 includes a second fixed fitting 231 that is configured to be fixed with respect to a vehicle wing. The second fixed fitting 231 may be fixed by bolts or any other fixing mechanisms. The slide mount 230 also includes the slide fitting 234 which is configured to engage the second fixed fitting 231 and to slide along an axis X with respect to the second fixed fitting 231 during a mounting and sighting operation.

In particular, the second fixed fitting 231 includes flanges 232a and 232b, and the slide fitting 234 includes flanges 235a and 235b which are configured to be supported by the flanges 232a and 232b and to slide on the surface of the flanges 232a and 232b. The slide fitting 234 also includes holes 238a and 238b for receiving bolts or other fixing mechanisms to fix the main body 221 of the rotatable mounting structure 220 with respect to the slide fitting 234.

Figure 5:
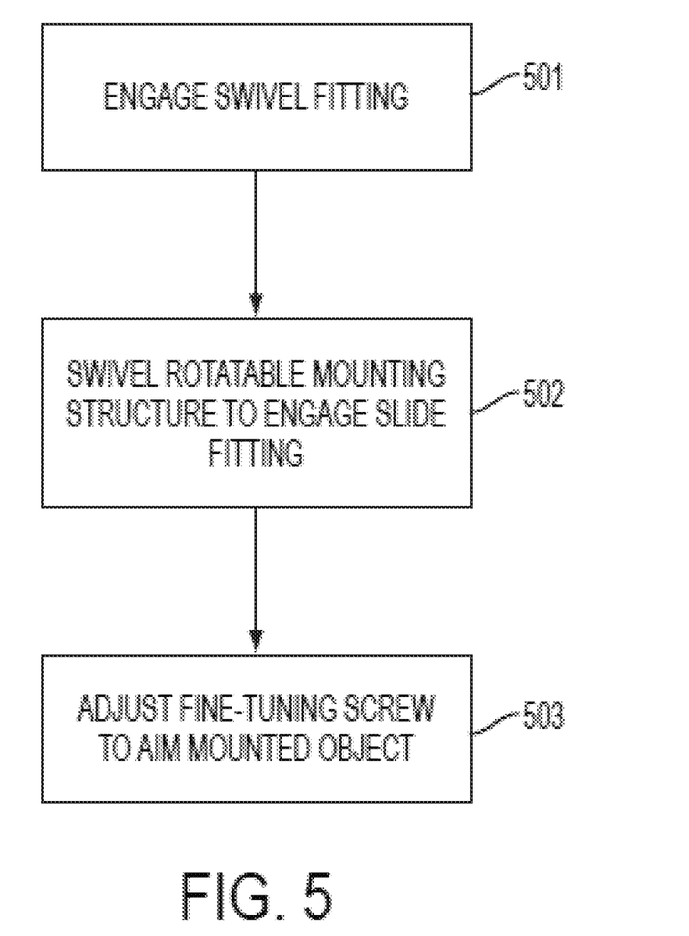
FIG. 5 is a block diagram of a method of mounting an object to a vehicle wing according to an embodiment of the invention.

FIG. 5 is a block diagram of a method according to an embodiment of the invention. The method will be described with reference to FIGS. 4A, 4B and 5.

In block 501, the swivel fitting 244 engages the first fixed fitting 241 by being inserted into the first fixed fitting 241. During insertion of the swivel fitting 244, the flanges 235a and 235b of the slide fitting 234 are un-aligned with the flanges 232a and 232b of the second fixed fitting 231. Then, as the swivel fitting 244 swivels within the first fixed fitting 241 in block 502, the flanges 245a-245c of the swivel fitting 244 align with the flanges 242a-242c of the first fixed fitting 241 to support the flanges 245a-245c of the swivel fitting 244. In addition, the flanges 235a and 235b of the slide fitting 234 slide over the flanges 232a and 232b of the second fixed fitting 231, such that the flanges 232a and 232b of the second fixed fitting 231 support the flanges 235a and 235b of the slide fitting 234.

Then, in block 503, the position of the main body 221 may be fine-tuned. To fine-tune the position of the main body 221 and an object connected to the rotatable mounting structure 220, the adjustment screw 233 may be adjusted. As illustrated in FIG. 4B, the slide fitting 234 includes a threaded lug 239 that is fixed with respect to the slide fitting 234. The threaded lug 239 includes a threaded portion 402 configured to engage threads 403 of the screw 233 to cause the slide fitting 234 to slide based on rotation of the screw 233. A spring plunger lock screw 401 engages with the head 408 of the screw 233 to lock the screw 233 into a desired position after the screw 233 has been rotated. The screw 233 includes a non-threaded portion 405 to slide with respect to the second fixed fitting 231, such that the screw 233 rotates within the second fixed fitting 231 without engaging the second fixed fitting 231 in a screw thread. A nut 404 engages a threaded portion 406 of the screw 233 to maintain the screw 233 in position. The second fixed fitting 231 also includes a hole 407 for fixing the second fixed fitting 231 to a vehicle wing, such as by a bolt, pin or other fixing mechanism.

While FIG. 4B illustrates one example of an adjustment screw 233, embodiments of the invention encompass any method and structure for controlling the position of the slide fitting 234 with respect to the second fixed fitting 231, including screws, bolts, pins, levers, latches or any other mechanisms capable of moving the slide fitting 234 then maintaining the slide fitting 234 in position with respect to the second fixed fitting 231.

According to embodiments of the invention, an object is mounted to a wing of a vehicle by engaging a swivel mount and a slide mount. The swivel mount includes a fixed portion and a swivel portion that engages the fixed portion and swivels with respect to the fixed portion. The slide mount includes a fixed portion and a slide portion that engages the fixed portion and slides with respect to the fixed portion. In particular, as the swivel portion of the swivel mount engages the fixed portion of the swivel mount, the slide portion of the slide mount engages the fixed portion of the slide mount and slides with respect to the fixed portion of the slide mount. In addition, fine-tuning of the alignment of the object may be performed by adjusting an adjustment screw of the slide mount.

In one embodiment of the invention, the object mounted to the wing of the vehicle is a weapon pylon mounted to the wing of an aircraft. In such an embodiment, the adjustment of the position of the weapon pylon includes sighting the weapon pylon to a point in front of the aircraft. The bore sight adjustment mechanism is capable of being attached to an existing store rack and provides accurate positioning of rocket launcher or fixed forward gun mount stores which interface to the aircraft by an ejector release unit. The bore sight adjustment mechanism provides bore sight harmonization of external stores mounted on opposite sides of the aircraft and allows for weapons firing point of convergence at a target point forward of the aircraft. This is accomplished by the forward slide mount and the aft swivel mount located between the aircraft pylon and an ejector release unit. The ejector release unit may correspond to the main body 221 of the rotatable mounting structure 220. The ejector release unit includes a fore linear T-Slide fitting assembly and an aft rotational T-Slide fitting assembly, with adjustment screw on the forward fittings to accomplish lateral locational translation of the store pivoting about the aft swivel mount.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A mounting apparatus, comprising:
   a fixed mounting structure that is fixed relative to a wing of a vehicle, the fixed mounting structure including a first fixed fitting and a second fixed fitting, wherein the first fixed fitting includes a plurality of first flanges;
   a rotatable mounting structure having a swivel fitting configured to engage the first fixed fitting and to swivel with respect to the first fixed fitting about an axis of rotation oriented generally perpendicular to the fixed mounting structure, the swivel fitting includes a plurality of second flanges, at least one of the plurality of second flanges being configured to rest on at least one of the plurality of first flanges when the swivel fitting is engaged with the first fixed fitting, the rotatable mounting structure also having a slide fitting configured to slide with respect to the second fixed fitting based on the swivel fitting being engaged with the first fixed fitting;
   an adjustment assembly arranged at an interface between the second fixed fitting and the slide fitting, the adjustment assembly being configured to adjust an angular position of the slide fitting relative to the swivel fitting.

2. The mounting apparatus of claim 1, wherein the swivel fitting is configured to swivel around the axis of rotation passing through the first fixed fitting and the swivel fitting when the swivel fitting is engaged with the first fixed fitting.

3. The mounting apparatus of claim 2, wherein the slide fitting is configured to slide in an arc with respect to the second fixed fitting wherein the axis of rotation is defined at a center of the arc.

4. The mounting apparatus of claim 1, wherein the plurality of first flanges are separated by first spaces, the first spaces being larger than the plurality of second flanges such that the swivel fitting is configured to engage the first fixed fitting by inserting the plurality of second flanges into the first spaces and rotating the swivel fitting until the second flanges engage the first flanges to rest on the first flanges.

5. The mounting apparatus of claim 1, wherein the second fixed fitting includes a at least one third flange and the slide fitting includes a at least one fourth flange, the at least one fourth flange being configured to slide over the at least one third flange when the swivel fitting is engaged with the first fixed fitting.

6. The mounting apparatus of claim 1, wherein the adjustment assembly includes a screw assembly configured to cause the slide fitting to slide with respect to the second fixed fitting based on a rotation of the screw assembly.

7. The mounting apparatus of claim 6, wherein the screw assembly comprises:
   a threaded lug fixed with respect to the slide fitting; and
   a screw positioned in the second fixed fitting and having a thread configured to engage the threaded lug, such that rotation of the screw within the second fixed fitting results in sliding of the slide fitting.

8. The mounting apparatus of claim 1, wherein the vehicle is an aircraft, the rotatable mounting structure is configured to hold an object beneath the wing of the aircraft, and the rotatable mounting structure is rotatable to point the object at a point ahead of the aircraft.

9. A method of mounting an object to a wing of a vehicle, comprising:
   engaging a swivel fitting with a first fixed fitting, the first fixed fitting fixed with respect to the wing and the swivel fitting rotatable about an axis of rotation oriented generally perpendicular with respect to the win wherein the first fixed fitting includes a plurality of first flanges and the swivel fitting includes a plurality of second flanges, at least one of the plurality of second flanges being configured to rest on at least one of the plurality of first flanges when the swivel fitting is engaged with the first fixed fitting; and
   engaging a slide fitting with respect to the second fixed fitting while the swivel fitting is engaged with the first fixed fitting, the slide fitting configured to slide with respect to the second fixed fitting while being supported by the second fixed fitting; and
   adjusting an angular position of the slide fitting relative to the swivel fitting via an adjustment assembly arranged at an interface between the second fixed fitting and the slide fitting.

10. The method of claim 9, wherein the swivel fitting is configured to swivel around the axis of rotation passing through the first fixed fitting and the swivel fitting when the swivel fitting is engaged with the first fixed fitting.

11. The method of claim 10, wherein the slide fitting is configured to slide in an arc with respect to the second fixed fitting wherein the axis of rotation is defined at a center of the arc.

12. The method of claim 9, wherein the plurality of first flanges are separated by first spaces, the first spaces being larger than the plurality of second flanges such that the swivel fitting is configured to engage the first fixed fitting by inserting the plurality of second flanges into the first spaces and rotating the swivel fitting until the second flanges engage the first flanges to rest on the first flanges.

13. The method of claim 9, wherein the second fixed fitting includes a at least one third flange and the slide fitting includes a at least one fourth flange, the at least one fourth flange being configured to slide over the at least one third flange when the swivel fitting is engaged with the first fixed fitting.

14. The method of claim 9,
wherein adjusting an angular position of the slide fitting relative to the swivel fitting comprises turning a screw located in the second fixed fitting.

15. The method of claim 14, wherein the screw assembly comprises:
a threaded lug fixed with respect to the slide fitting; and
the screw positioned in the second fixed fitting and having a thread configured to engage the threaded lug,
wherein rotating the screw within the second fixed fitting causes the slide fitting to slide with respect to the second fixed fitting.

16. The method of claim 9, wherein the vehicle is an aircraft, the method further comprising:
aligning a front of an object mounted to the swivel fitting and the slide fitting to a point in front of the aircraft by sliding the slide fitting with respect to the second fixed fitting.

* * * * *